United States Patent [19]

Ordo

[11] Patent Number: 5,390,560
[45] Date of Patent: Feb. 21, 1995

[54] COUNTERSHAFTS POWER TRANSMISSION

[75] Inventor: Richard A. Ordo, Greenwood, Ind.

[73] Assignee: General Motors Corporation, Detroit, Mich.

[21] Appl. No.: 15,698

[22] Filed: Feb. 9, 1993

[51] Int. Cl.⁶ .............................................. F16H 3/08
[52] U.S. Cl. ........................................ 74/329; 74/331
[58] Field of Search ................. 74/325, 329, 331, 360

[56] References Cited

U.S. PATENT DOCUMENTS

| | | | |
|---|---|---|---|
| 2,511,539 | 6/1950 | Orr | 74/331 |
| 2,612,787 | 10/1952 | Youngren | 74/331 |
| 4,476,737 | 10/1984 | Young | 74/331 X |
| 4,916,960 | 4/1990 | Inui et al. | 74/333 X |
| 5,009,118 | 4/1991 | Raszkowski et al. | 74/331 |
| 5,014,566 | 5/1991 | Kashiwase | 74/331 |

*Primary Examiner*—Dirk Wright
*Assistant Examiner*—Khoi Q. Ta
*Attorney, Agent, or Firm*—Donald F. Scherer

[57] ABSTRACT

A countershaft transmission has an input shaft and a coaxial output shaft which are disposed in parallel with a pair of countershafts. The countershafts position and support a floating bearing support which is positioned to support ends of the input and output shafts. The countershafts each have a selectively engageable clutch disposed thereon which selectively control the establishment of drive ratios between the input shaft and the respective countershafts. A plurality of forward and reverse ratios are selectively established, between the input and output shafts through the countershafts, by selectively engaging a plurality of synchronizers. The synchronizers cooperate with a plurality of ratio gears on the countershafts and output shaft to establish the ratios. The ratio gears that establish the lowest forward ratios are fully disengageable from their respective countershafts.

4 Claims, 4 Drawing Sheets

COUNTERSHAFTS POWER TRANSMISSION

TECHNICAL FIELD

The present invention relates generally to power transmissions. More particularly, the present invention relates to transmissions having parallel countershafts. Specifically, the present invention relates to dual clutch preselected ratio transmissions.

BACKGROUND OF THE INVENTION

The use of countershaft transmissions having synchronizers for connecting various ratio gears to their respective shafts and then engaging a rotating fluid-operated clutch is well known. These transmissions are commonly termed "preselected dual clutch transmissions." Generally, these transmissions incorporate two selectively engageable fluid operated clutches and power operated synchronizers. These transmissions require bearing members to provide radial and thrust support of the various gear elements. The input clutches in a dual input clutch preselected type transmission are provided on the input axis. The clutches, therefore, rotate at the input, or engine, speed. Thus, the spin losses, in the open running clutch, can be quite high. The power transmission from the input shaft to the countershafts is generally provided at the same ratio.

One or more of the power shafts will generally require internal bearing supports. That is the shaft must be supported at a bulkhead which is secured in the transmission case. This complicates the assembly of these transmissions. When bulkheads are not used, all of the shafts extend the full length of the transmission and bearing support provisions must be made in the transmission case and end cover. A further disadvantage of these transmissions is found in that all of the gear members disposed on respective countershafts will rotate whenever the shaft is transmitting power.

SUMMARY OF THE INVENTION

It is, therefore, a primary object of the present invention to provide an improved countershaft transmission wherein the spin losses of the non-power transmitting gears is minimal.

It is another object of the present invention to provide an improved countershaft transmission, as above, wherein the low ratio non-power transmitting gears are disconnected from their respective shafts.

It is a further object of the present invention to provide an improved countershaft transmission, as above, wherein the first and second forward ratios are transmitted through a common cluster gear which is disconnected from its respective shaft during the other forward ratios.

These and other objects of the invention, as well as the advantages thereof over existing and prior art forms, which will be apparent in view of the following detailed specification, are accomplished by means hereinafter described and claimed.

In general, a transmission embodying the concepts of the present invention provides a dual input clutch preselected countershaft type transmission wherein each countershaft supports a cluster gear which is operable to transmit torque during at least the two lowest forward ratios and the reverse ratio. The cluster gears are disconnected from their respective shafts during the higher forward ratios and therefore reduce the spin losses in the transmission to effect a higher overall efficiency.

The present invention has parallel countershafts which are equally spaced from coaxial input and output shafts such that the output shaft has disposed thereon a plurality of output gear members which mesh with ratio gear pairs on each of the countershafts. Inasmuch as the countershafts are equally spaced from the main shaft and the ratio gear pairs mesh with respective gears on the output shaft, each ratio gear member is identical in size. This reduces the tooling and production costs of any of the ratio gear elements, because they will be produced in pairs, thereby doubling the output from the production tooling.

In order to provide a reduced axial length transmission and establish a firm rotary support for the input shaft and output shaft, a floating beating support is secured to or positioned by the countershafts. The bearing support is disposed to provide a rotary bearing housing for the one end of the output shaft and input shaft while the other end of each of these shafts is rotatably supported in an end plate or the transmission housing. The countershafts are also rotatably supported in the end plate and transmission housing such that the maintenance of parallelism between the individual shafts is improved and the floating beating support compensates for any minor tolerance differentiation which might occur.

The transmission has two low ratios (first and second) in which cluster gears are secured through synchronizers to the respective countershafts. However, during higher gear ratio performance these cluster gears are disengaged from their respective countershafts such that relative rotation of the gear members and slip losses which accompany the rotation thereof are nonexistent, thereby improving the overall efficiency of the transmission.

The transmission, being a dual countershaft type with the selectably engageable, fluid operated clutches being disposed on the countershafts, will permit simultaneous slipping engagement of the input clutches. Thus, the ratio gear members can be conditioned by their synchronizers or both first and second forward gear ratios and both input clutches can be slippingly engaged to split the input torque thereby reducing the capacity requirement of any individual clutch during startup. Through the use of the well known electronic control structures the input to output speed ratio can be readily determined through conventional sensors. When the ratio between the shafts is equal to the numerical gear ratio established by the first ratio, the one (first ratio) clutch can be fully engaged while the other (second ratio) clutch is permitted to disengage. This will maintain the transmission in the first forward speed ratio. The second forward speed ratio is accomplished by simply swapping the input clutches inasmuch as the second speed synchronizer can remain engaged after the slipping starting function is discontinued. The upshifting and downshifting of the various ratios is accomplished in accordance with the well known principles of preselected dual input countershaft type transmissions. That is, the oncoming gear ratio is selected via the respective synchronizer and then the swapping of input clutches permits the change of ratio between the input and output shaft.

The present invention is described in conjunction with one exemplary embodiment of a countershaft transmission which is deemed sufficient to effect a full disclosure of the subject invention. The exemplary countershaft transmission is described in detail without attempting to show all of the various forms and modifications in which the invention might be embodied; the invention being measured by the appended claims and not by the details of the specification.

DESCRIPTION OF AN EXEMPLARY EMBODIMENT

Figure 1:
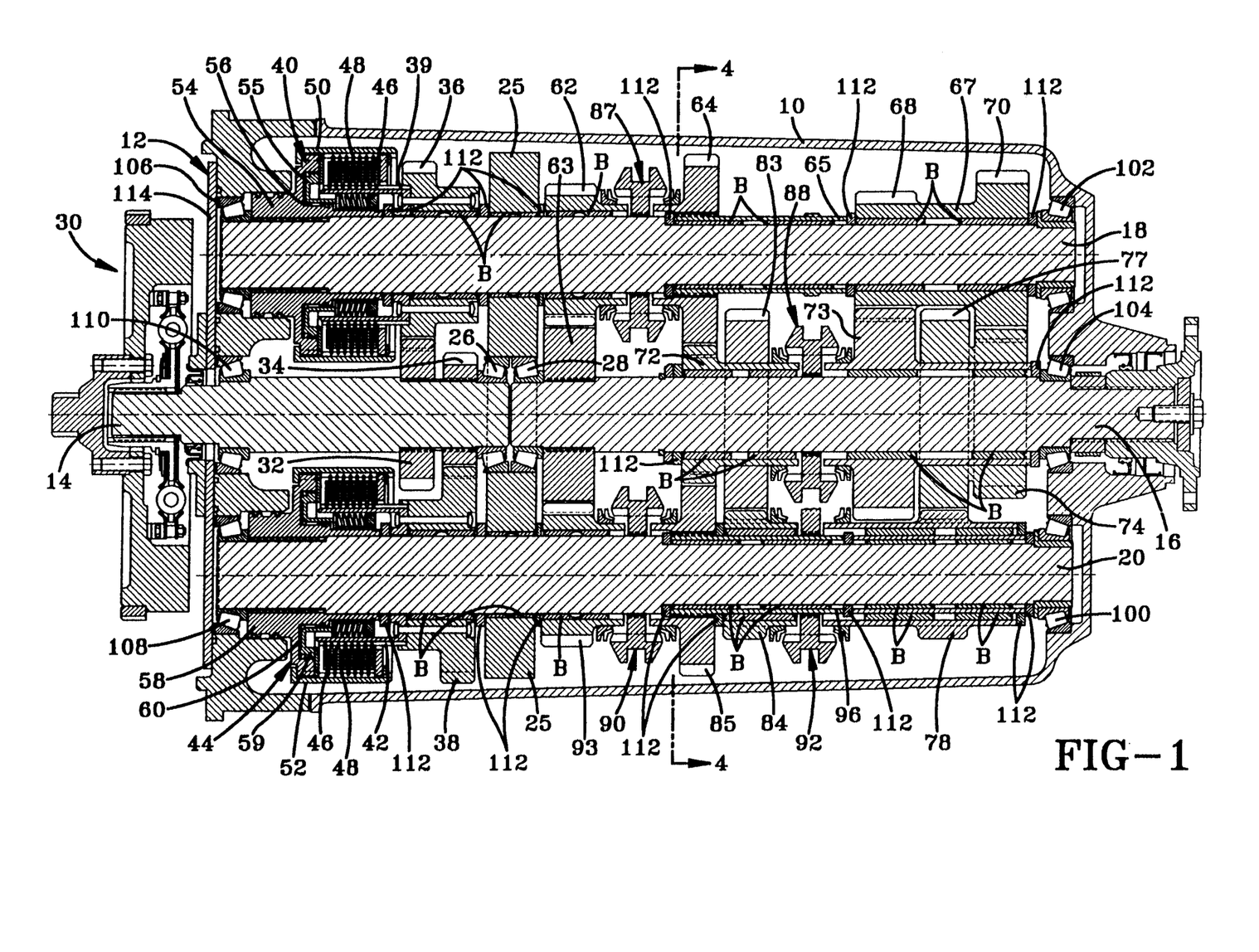
FIG. 1 is an elevational view of a transmission incorporating the present invention and,taken substantially along line 1—1 in FIG. 4.
Figure 2:
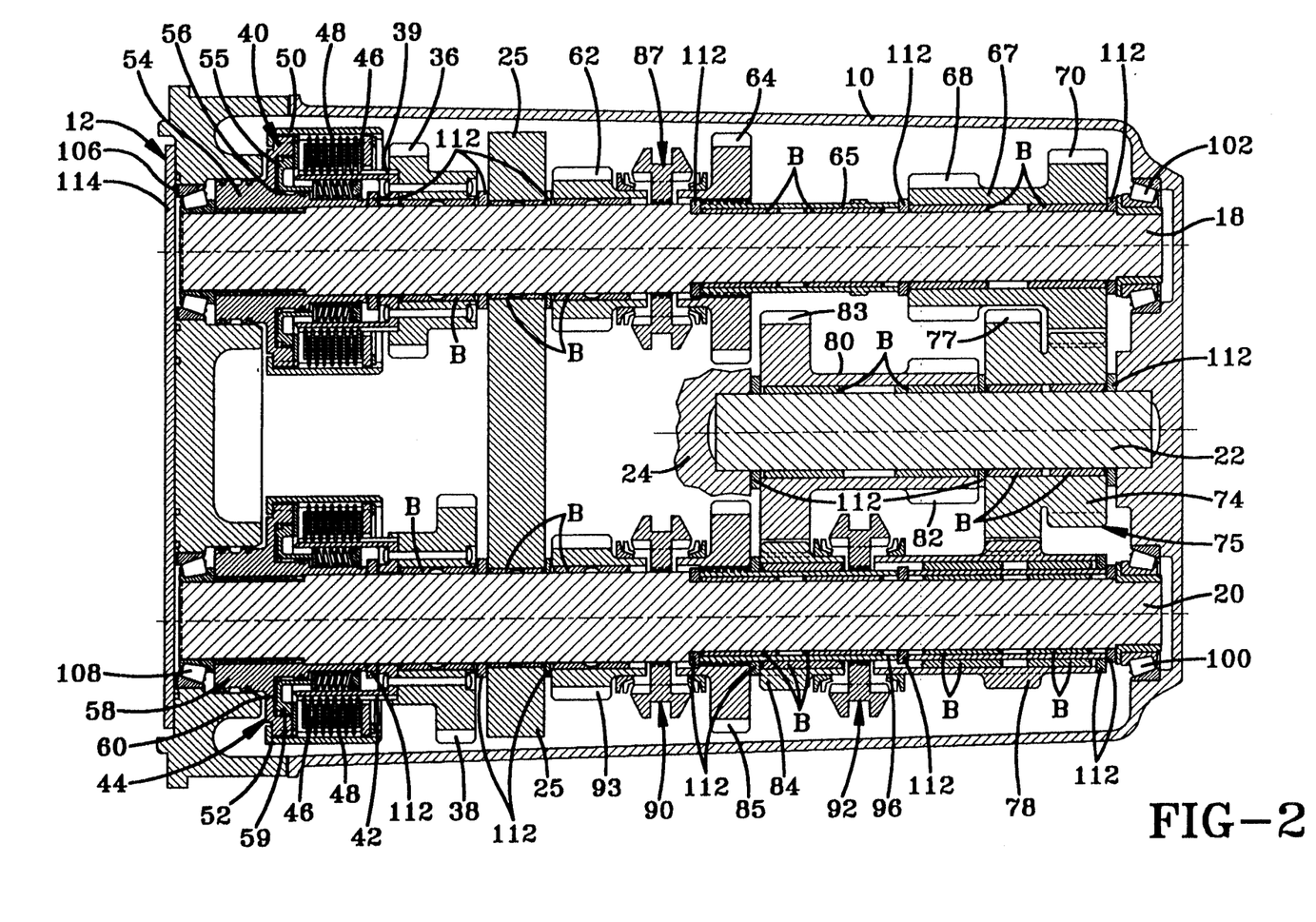
FIG. 2 is an elevational view of a transmission incorporating the present invention and taken substantially along line 2—2 in FIG. 4.

Referring to the drawings wherein like characters represent the same on corresponding parts throughout the several views there is shown in FIG. 1 a cross-sectional view of a transmission having a housing 10 with an end cover assembly 12. The housing 10 and cover assembly 12 rotatably support an input shaft 14, an output shaft 16, coaxially aligned with the input shaft 14, a pair of countershafts 18 and 20 and as seen in FIG. 2 a reverse idler shaft 22. The idler shaft 22 is rotatably supported in the housing 10 and in a bulkhead 24 which is formed integrally with or otherwise secured in the housing 10. The transmission further includes a floating bearing support 25 which is positioned by the countershafts 18 and 20 and has tapered roller bearings 26 and 28 which rotatably support ends of the input shaft 14 and output shaft 16, respectively.

The input shaft 14 has drivingly connected therewith a flywheel and damper assembly 30 which is constructed in a conventional manner to provide dampening of the torsional vibrations which are introduced from the engine. The input shaft 14 has a pair of head gears 32 and 34 rotatably secured thereto which mesh with head gears 36 and 38, respectively. The headgear 36 is rotatably fast with a hub 39 of a conventional fluid-operated clutch assembly 40. The headgear 38 is secured rotatably fast with a hub member 42 which is a component of a conventional fluid-operated clutch assembly 44.

The clutch assemblies 40 and 44 are preferably of identical construction. Each assembly 40 and 44 include a plurality of friction disks 46 drivingly connected with the respective hubs 39 and 42 and a plurality of interspaced friction disks 48 rotatably fast with clutch housings 50 and 52 of the clutch assemblies 40 and 44. The clutch assembly 40 has an input hub 54 which is splined to the countershaft 18. The clutch hub 54 slidably supports a piston 55 in a fluid chamber 56. The clutch assembly 40 is actuated by supplying fluid pressure to the chamber 56 in a normal manner such that the piston 55 will enforce frictional engagement between the interspaced clutch plates or friction plates 46 and 48 result in a frictional drive connection between the headgear 36 and the countershaft 18. With the clutch 40 engaged a drive connection and gear ratio between the input shaft 14 and the countershaft 18 is established.

The clutch assembly 44 has a hub member 58 which slidably supports the piston 59 in a fluid chamber 60. The clutch 44 is engaged in a conventional manner by admitting fluid pressure to the chamber 60 such that the piston 59 will enforce frictional engagement between the clutch plates 46 and 48 thereby establishing a frictional drive connection between the headgear 38 and the countershaft 20. With the friction clutch 44 engaged a drive connection and gear ratio between the input shaft 14 and the countershaft 20 is established.

The friction clutch assemblies 40 and 44 are conventional devices and those skilled in the art will be quite familiar with their operation. It is well known that these devices can be selectively engaged and disengaged by the admission of fluid pressure to provide a torque-transmitting drive connection between mechanical members such as gears and shafts. Also, the pressure can be controlled to provide a slipping engagement.

The countershaft 18 has rotatably supported thereon a gear member 62 which is disposed in a meshing relationship with an output gear 63 which is splined to the output shaft 16. The countershaft 18 has rotatably supported thereon a gear member 64 which is spline connected to a sleeve member 65 which is rotatably supported on the countershaft 18. A cluster gear 67 is rotatably supported on the countershaft 18 and has two gear portions 68 and 70.

The gear member 64 is disposed in meshing relationship with a gear member 72 which is rotatably supported on the output shaft 16. The gear portion 68 of cluster gear 67 is disposed in meshing relationship with a gear member 73 which is rotatably supported on the output shaft 16 and the gear portion 70 of the cluster gear 67 is disposed in meshing relationship with a gear portion 74 of a cluster gear 75 which is rotatably supported on the idler shaft 22. The cluster gear 75 also includes a gear portion 77 which is disposed in meshing relationship with a gear member 78 which is rotatably supported on the countershaft 20. Also rotatably supported on the idler shaft 22 is a reverse cluster gear 80 which includes gear portions 82 and 83 disposed in meshing relationship with gear 73 rotatably supported on the output shaft and a gear 84 rotatably supported on the countershaft 20. The countershaft 20 also has a gear 85 rotatably supported thereon which is disposed in continuous meshing relation with the gear 72 rotatably supported on the output shaft 16.

A conventional synchronizer assembly 87 is drivingly connected to the countershaft 18. This synchronizer assembly is manipulated in a well known manner to selectively establish drive connections between either gear 62 with the countershaft 18 or gear 64 with the countershaft 18 or the synchronizer 87 can be placed in a neutral position such that neither gear 62 or 64 is rotatably connected with the countershaft 18. The output shaft 16 has a conventional synchronizer assembly 88 which is selectively manipulated to provide a drive connection between the output shaft 16 and either gear 72 or gear 73. Likewise the synchronizer 88 may be maintained in a neutral position such that neither gear 72 nor 73 has a drive connection with the output shaft 16. The countershaft 20 has a conventional synchronizer assembly 90 drivingly connected therewith. The synchronizer assembly 90 is selectively operable to provide a drive connection between the countershaft 20 and the gear 85 or between the countershaft 20 and a gear 93 which is disposed in meshing relationship with the gear 63 drivingly connected with the output shaft 16. As with synchronizers 87 and 88, the synchronizer assembly 90 can be maintained in a neutral position. The synchronizer assembly 92 is selectively operable to control engagement of the gear 84 or the gear 78 with a sleeve shalt 96. The synchronizer 92 can also be maintained in a neutral position.

Figure 3:
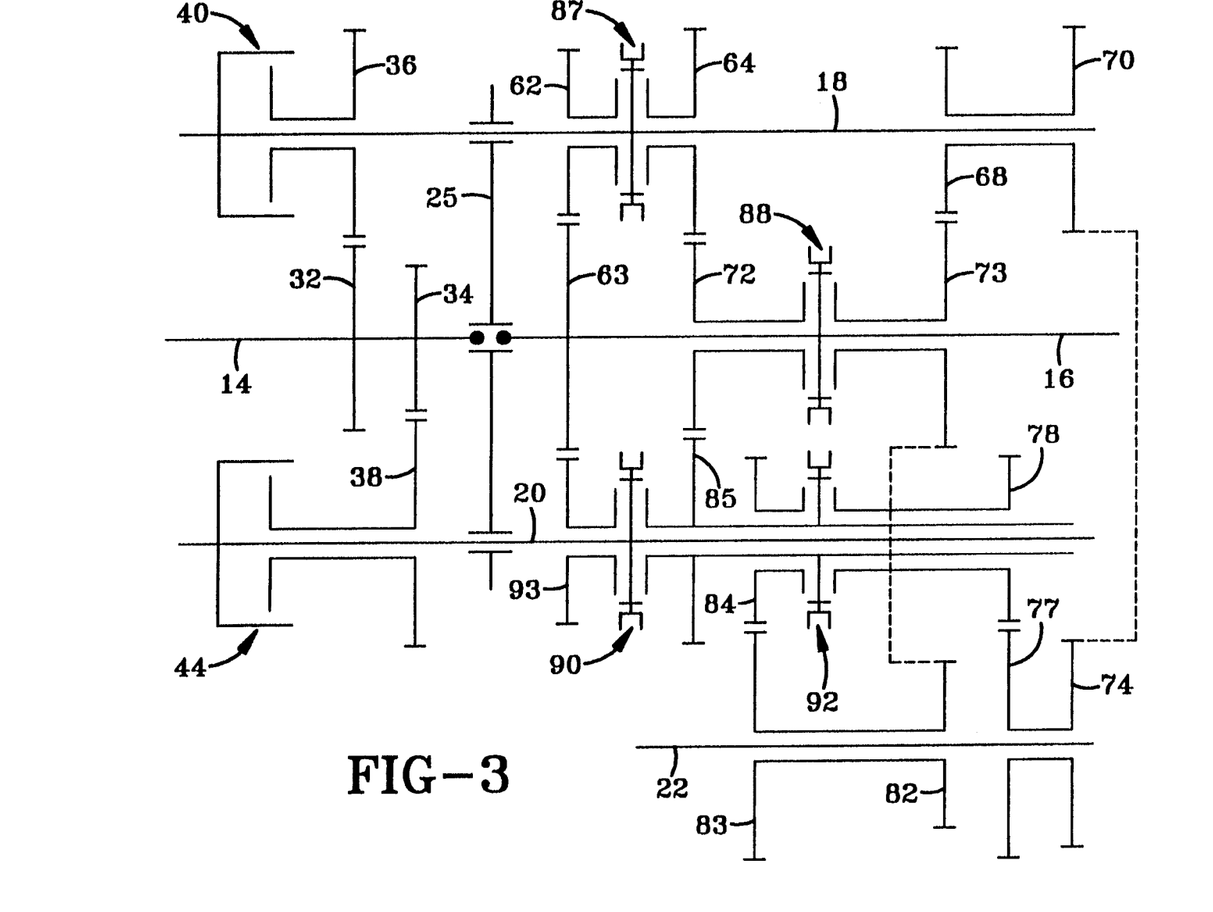
FIG. 3 is a schematic representation of the gearing arrangement shown in FIGS. 1 and 2; and, FIG. 4 is a view taken substantially along line 4—4 in FIG. 1.
Figure 4:
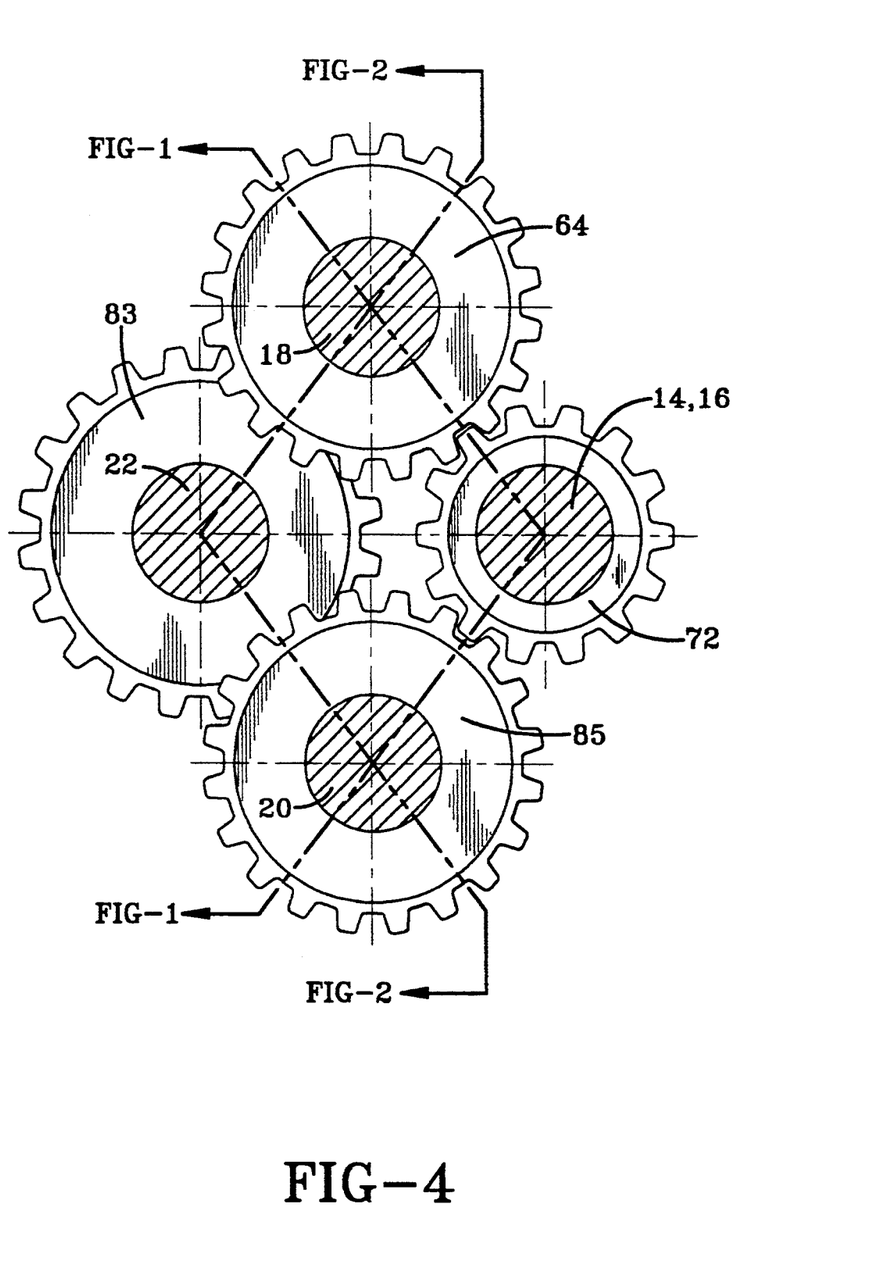

By judicious selection of the synchronizers 87, 88, 90 and 92 and the selective engagement of clutch assemblies 40 and 44 the gearing arrangement of this transmission will provide six forward speed ratios and two reverse speed ratios. The schematic representation shown in FIG. 3 is perhaps more clear in describing the gear ratios and the drive connections which are established by the judicious manipulation of the synchronizers 87, 88, 90 and 92. To establish the first and lowest forward speed ratio the synchronizer 88 is manipulated to connect gear 73 with the output shaft 16. The synchronizer 90 is manipulated to connect the gear 85 to the countershaft 20 and the synchronizer 92 is manipulated to connect the gear 78 to the synchronizer 90 through the sleeve shaft member 96.

With the clutch assembly 44 engaged the input drive will come from the shaft 14 through the headgear set 34 and 38 and clutch 44 to the countershaft 20. The drive will then be transmitted through the synchronizer 90, sleeve 96 and the synchronizer 92 to the gear 78. From there the drive is transmitted through gears 77, 74, 70 and 68 to the gear 73 which is connected to the output shaft by the synchronizer 88.

The second forward speed is provided by manipulation of the synchronizer 87 to connect the gear 64 with the countershaft 18 and the synchronizers 88 and 92 are maintained in their previous conditions for the first forward speed. The second forward speed is established by disengaging the clutch assembly 44 by engaging the clutch assembly 40. With the clutch assembly 40 engaged the drive is from the input shaft 14 through the headgear set 32 and 36 to the countershaft 18. When the countershaft 18 drive is transmitted through synchronizer 87, gears (>4, 72 and 85 to the shaft 96 from which it is transmitted through synchronizer 92 and the gears 78, 77, 74, 70, 68 and 73 as described above. From gear 73 the drive is transmitted through synchronizer 88 to the output shaft 16. It will be appreciated at this point that the headgear 32 is of a larger diameter than the headgear 34 such that the countershaft 18 will rotate faster than the countershaft 20 when their respective clutches are engaged. Thus, the synchronizers 88 and 92 provided the same gear path from the sleeve 96 to the output shaft 16 while the headgear set 32 and 36 provided a faster input speed to the gear-mesh established by these synchronizers.

The third forward speed is established by manipulating the synchronizer 90 such that gear 93 is connected with the countershaft 20. It should be appreciated that during the first forward speed the synchronizer 87 is preselected to engage gear 64 without any torque being transmitted until the clutch 40 is engaged. Thus, the second gear ratio is preselected while the first gear is transmitting torque. Likewise the synchronizer 90 can be disengaged under no load from the gear 85 and connected to the gear 93 under no load while the transmission is operating in the second forward ratio. Then by simply interchanging the clutch assemblies 40 and 44, the preselected third forward speed is established. The third forward speed is provided by the headgear set 34 and 38 driving the countershaft 20 which in turn drives the gear 93 through the synchronizer 90. The gear 93 drives the gear 63 which is in continuous drive connection with the output shaft 16.

It should be appreciated at this point that the gear assembly comprised of the gears 85, 84, 83, 82, 77, 74, 78, 70, 68, 73, 72 and 64 are free of any drive connections. That is, the synchronizer 90 is connected to establish the drive connection between gear 93 and shaft 20, thus, the gear 85 is free from the synchronizer 90 and the synchronizer 87 is manipulated to the neutral condition, therefore the gear 64 is freely rotatable on the shaft 18 and is not drive-connected. Thus, the spin losses which is normally associated with rotating meshing gears is greatly reduced in the present invention by permitting this disconnection for drive ranges above the first and second.

The fourth forward gear ratio is established by moving the synchronizer 87 to preselect the drive connection between the gear 62 and the shaft 18. This can be done without the torque being transmitted. Following the establishment of the synchronizer 87 the clutch 40 is engaged while the clutch 44 is disengaged, thus the drive path in the fourth forward ratio is from the input shaft 14 through the headgear set 32 and 36 to the shaft 18 and from the shaft 18 through gears 62 and 63 to the output shaft 16. With the clutch 44 disengaged the synchronizer 90 can be manipulated without torque load to disengage the gear 93 and reengage the sleeve 96. Also at this point the synchronizer 88 can be manipulated to provide a drive connection between the gear 72 and the output shaft 16 without transmitting torque. With this preselection of the synchronizers 90 and 88 the clutch 44 can be reengaged while the clutch 40 is disengaged, thus establishing the fifth forward speed ratio.

During the fifth forward speed ratio the drive path is from the input shaft 14 through the headgear set 34 and 38 to the shaft 20. From the shaft 20 the drive connection is through the synchronizer 90 to gear 85 and then through synchronizer 88 to the output shaft 16. Again it should be appreciated that the gears 84, 83, 82, 73, 68, 70, 74, 78 and 77 are free of any input forces and therefore will not contribute to the spin losses in the transmission.

With the clutch 40 disengaged, the synchronizer 87 can be manipulated to disengage gear 62 and engage gear 64 without any torque loads being imposed thereon. Following this manipulation the clutch 44 can be disengaged while the clutch 40 is engaged, thus establishing the sixth and highest forward speed ratio. In the sixth forward speed ratio the drive path is through the headgear set 32 and 36 to the countershaft 18 and then through the synchronizer 87, gear 62 and gear 63 to the output shaft 16. Thus, there are six forward speed ratios provided. It should also be appreciated that in sixth gear the spin losses of the aforementioned gear meshes are not contributing to the spin losses within the transmission.

A reverse drive connection is established by engaging the synchronizer 88 with the gear 73, the synchronizer 90 with the gear 85 and the synchronizer 92 with the gear 84. With the synchronizer in this position the clutch 44 is engaged providing a drive connection from the input shaft 14 to the output shaft 16 via the headgear set 34 and 38 to the countershaft 20 and from the countershaft 20 through the sleeve 96 to the gear 84 and then via the reverse idler gears 83 and 82 to the gear 73 which is drivingly connected with the output shaft 16. The gears 83 and 82 provide a reversing function such that the output shaft 16 rotates in a direction opposite to the input shaft 14. While it may not be readily apparent from the foregoing description, the low gear drive path and the reverse gear drive path provide identical ratio coverage between the input shaft and the output shaft with the difference being reverse is an opposite rotation output. This is a feature that is advantageous in power transmissions since the pulling or starting torque of the vehicle will be the same in both the forward and reverse directions.

The second reverse gear or ratio is established by engaging the synchronizer 87 with the gear 64, the synchronizer 88 with the gear 73 and the synchronizer 92 with the gear 84. In this reverse ratio the fluid operated clutch 40 is engaged thus providing a drive path from the input shaft 14 to the countershaft 18, through gears 64, 72 and 85 to the gear 84. From the gear 84 the drive is transmitted through the reverse idler gears 83 and 82 and through the gear 73 to the output shaft 16 through the synchronizer 88.

The head gears 32, 36, 34 and 38 provide speed ratio differences between the input shaft and the respective countershafts 18 and 20. This speed differential caused by the two headgear sets permits the ratio gear sets to be of equal size. In other words gears 62 and 93 are of equal diameter, and gears 64 and 85 are of equal diameter. Thus, the forward gears ratios provided by the judicious manipulation of synchronizers 90 and 87 have a step or fixed differential between them caused by the ratio difference created by the headgear set 36 and 32 as compared to the headgear set 38 and 34. This will permit the gear members 93 and 62 to use the same tooling and gear 64 and 85 to use the same tooling when the gear teeth are being cut, thus reducing the capital investment and tooling cost.

The gear members provided in the present invention are supported on bushings on their respective shaft members. The only high capacity thrust bearings needed in the assembly are the taper roller bearings 100, 102 and 104 disposed in the housing 10 and rotatably supporting the shafts 16, 18 and 20, respectively. The other end of shaft 16 is supported by the taper roller bearing 28 which is supported in the floating bearing support 25. The other ends of shafts 18 and 20 are supported in thrust bearings 106 and 108, respectively, which are secured the end cover assembly 12. The input shaft 14 is rotatably supported in a tapered roller bearing 110 secured in the end cover assembly 12 and in the roller bearing 26 secured in the floating bearing support 25. These tapered roller bearings are sufficient to absorb and support all of the thrust loads which might be occasioned during the transmission of power between the input shaft 14 and the output shaft 16. The ratio gears and head gears 36 and 38 are supported on plain journal bearings B which require a minimum of lubrication. The use of plain journal bearings is permitted since the respective gears are only carrying loads when they are rotatably fast with their respective shaft lines. Thus, the bearings of the gear members do not have to support relative rotation between the gear member and the respective shaft member while load carrying is being accomplished.

The gear member 85 is connected via the sleeve shaft 96 to one side of synchronizer 90 and to the center member of synchronizer 92. This unique arrangement permits the sleeve shaft to judiciously connect gears 84 and 78, through the synchronizer 92, to the gear 85. This unique sleeve shaft arrangement also permits the gears to idle freely whenever the ranges three through six are engaged. As previously pointed out, this greatly reduces the spin losses normally associated with free running gears in countershaft transmissions.

As mentioned with the forward ratio gears it should also be appreciated that the reverse idler cluster gear 80 is also supported on plain journal bearings B, as is the cluster gear 75 which is transmitting loads during the first gear ratio. Any minor thrust loads that might occur in the gear system are taken up by simple thrust washers which are all indicated by a common designation 112. These thrust washers as is well known are generally plain flat washers with a bearing metal coating on the annular faces.

The synchronizer 88 which is drivingly connected to the output shaft 16 and selectively operable to create engagement of gears 72 and 73 with the output shaft 16 permits the use of the overdrive gear set, namely gears 64 and 72 as an idler gear during the second ratio forward and the second reverse gear. This same synchronizer 88 permits the disengagement of the gears operable in the first and second forward ratios and both reverse ratios at the higher speeds. As previously mentioned, this reduces the spin losses in the transmission. The central floating bearing support 25 allows the use of smaller diameter countershafts because the perceived bending moments thereof are reduced. One other manufacturing item that is of some importance is the fact that the shafts 18 and 20 are of identical construction, thus the inventories required to maintain production are reduced as is the expense of machine tooling since only a single machine setup is required to provide both countershafts 18 and 20.

The clutch assemblies 40 and 44 are disposed at the forward end of the transmission. This permits the clutches to be easily accessible to a conventional hydraulic control mechanism which is utilized to cause the engagement and disengagement of the clutches. The clutches 44 and 40 are identical in construction further reducing the number of elements required in inventory to complete an assembly and reduces the equipment necessary for machining the elements. It is possible to use both the clutches 40 and 44 during startup of the vehicle. This is accomplished by engaging the synchronizers 88, 90, 92 as well as synchronizer 87 which, as can be determined from the above description, conditions the transmission for both first and second forward speeds. By engaging clutch 44 as was previously described the first or lowest speed ratio is obtained with this synchronizer arrangement and by engaging clutch 40 the second speed ratio is obtained. However, by providing a proper hydraulic control function the clutches 40 and 44 can be placed in slipping engagement thereby limiting the torque by the slipping speed of the clutch. Slipping clutch control devices are known to those skilled in the art as are automatic and manual controls for synchronized operation.

Thus, the power at the input shaft 14 can be split between slipping clutches 40 and 44 and passed through the respective first and second drive ratio paths to be combined at the output shaft 16. This slipping engagement can be continued until the control mechanism recognizes the speed differential between the input shaft 14 and the output shaft 16 as equal to the ratio established during the first forward gear operation. At this point the clutch 44 is fully engaged and the clutch 40 is disengaged. The vehicle will continue to operate in the first and lowest forward gear ratio until an upshift to the second ratio is undertaken. As previously mentioned the upshift from first to second is accomplished by swapping or interchanging the clutches 40 and 44. One method of determining when the input and output speed ratio is proper is to measure the rotary speed of the input and rotary speed of the output. By comparing these speeds and determining when the ratio therebetween is equal to the first gear ratio, the clutch operation can be proceeded with as described above. In at least one embodiment of the present invention it is desired to have a first ratio equal to 5.74. That is the input shaft will rotate at 5.74 times the speed of the output shaft. Thus, when this ratio is measured by the components within the control system, the clutch 44 will be fully engaged while the clutch 40 would be completely disengaged. This dual clutch starting procedure permits the use of clutches of less torque and heat capacity than might otherwise be required to launch a vehicle of a given size.

As previously mentioned the journal bearings B which radially support the ratio gears within the transmission require a minimum of lubrication. That is, the oil can be supplied to the beatings at a very low pressure since the support pressure is generated by hydrodynamic forces—that is, the speed of the beating itself or the speed of the gear on the bearing is what creates the hydraulic pressure to support the bearing during relative rotation. Since the beatings do not have to support any rotary high load on gear members, the hydrodynamic pressure can be considerably less and therefore the feed pressure for the lube system is considerably reduced when compared to transmissions wherein the relatively rotating gears must transmit loads.

The dual countershaft transmission requires a different assembly procedure than a planetary unit. Due to the mechanical engagements of the various gear sets, the shaft assemblies can not be installed into the main case sequentially. The four shafts, with bearings mounted thereon, must be assembled on a slave build-fixture in order to allow the proper sequence of engagements. The two partially assembled countershafts 18 and 20 are placed vertically into the fixture with their input ends oriented upwardly. The output shaft 16 is vertically fixtured and then moved horizontally into gear engagement with the two countershafts 18 and 20.

With the centerlines being thus established, the floating bearing support 25 can be installed over the three shafts 16, 18 and 20. The headset gear assemblies 36 and 38 are installed onto their respective countershafts 18 and 20. The input shaft assembly 14 is then installed with operative engagement between the bearing 26 and the floating bearing support 25 and with the headset gears 32 and 34 on the input shaft engaging the headset gear assemblies 36 and 38 on the respective countershafts 18 and 20. The clutch assemblies 40 and 44 are then installed on their respective countershafts 18 and 20.

The gear train assembly thus produced is then lifted, with a special fixture, and lowered into the housing 10, which is vertically oriented on the final assembly stand with the opening depicted at the left in FIGS. 1 and 2 facing upwardly.

The end cover assembly 12 with its respective bearings 106, 108 and 110 is placed over the ends of the shafts 14, 18 and 20. The end cover assembly 12 has an end plate 114 that is removable and permits the use of shims at the bearings 106, 108 and 110 to ensure the proper end play is achieved in the overall assembly of the transmission. The shims are preferably adjustable which permits rapid assembly of the transmission.

As will be appreciated from the foregoing discussion and description of the transmission assembly, what is provided with the present invention is a dual input clutch preselected transmission. That is, each ratio which is either higher or lower than the ratio being utilized can be preselected and then engaged by the interchange of the friction clutches. For example, if the transmission is operating in the third forward speed with the synchronizer 90 engaging the gear 93 and the clutch assembly 44 engaged, the fourth ratio can be preselected by engaging the synchronizer 87 with the gear 62 and the second forward ratio can be preselected by engaging the synchronizer 87 with the gear 64 and the synchronizer 88 with gear 73 and the synchronizer 92 with the gear 78. Then by interchanging clutches 44 and 40 the preselected ratio becomes the power ratio and the synchronizers that are not transmitting are free to permit preselection of their respective ratios.

I claim:

1. A power transmission comprising, in combination:
   input shaft means;
   output shaft means;
   a pair of countershaft means parallel with said input shaft means and said output shaft means;
   a cluster gear supported on one of said countershaft means;
   said cluster gear presenting two gear portions, each of which serves as a gear means;
   an idler shaft means parallel with said input and output shaft means;
   a cluster gear and a reverse cluster gear supported on said idler shaft means;
   said cluster gears each presenting two gear portions, each of which serves as a gear means;
   gear and clutch means for selectively drivingly connecting the input shaft means with respective ones of the countershaft means;
   exclusive low ratio gear means selectively connectable between respective ones of said countershaft means;
   a plurality of said gear means supported on said idler shaft means and said output shaft means for establishing two low forward ratios and at least one reverse ratio between the input and output shaft means;
   exclusive high ratio gear means selectively connectable between respective ones of said countershaft means for selectively establishing a plurality of higher ratios between the input and output shaft means; and,
   said exclusive low ratio gear means selectively disconnected from torque transmission and direct rotary forces during the operation of the exclusive high ratio gear means.

2. A power transmission, as set forth in claim 1, wherein the exclusive low ratio gear means further comprises:
   said cluster gear rotatably supported on one of said countershaft means;
   synchronizer means for selectively connecting said gear means on the other of said countershafts with said cluster gear on said idler shaft.

3. A power transmission, as set forth in claim 2, wherein:
   a gear portion on said cluster gear supported from said idler shaft matingly engages said cluster gear means on one of said countershafts.

4. A power transmission, as set forth in claim 1, wherein said exclusive low ratio gear means further comprises:

said reverse cluster gear rotatably supported on said idler shaft means;

synchronizer means for selectively connecting said reverse cluster gear to a gear means on one of said countershafts.

* * * * *